(12) United States Patent
Bailey et al.

(10) Patent No.: US 11,094,206 B2
(45) Date of Patent: Aug. 17, 2021

(54) VERTICAL FLIGHTPATH OPTIMIZATION

(71) Applicant: THE BOEING COMPANY, Chicago, IL (US)

(72) Inventors: Louis J. Bailey, Auburn, WA (US); Jose A. Fregnani, Sao Jose dos Campos (BR); Italo Romani De Oliveira, Sao Jose dos Campos (BR)

(73) Assignee: THE BOEING COMPANY, Chicago, IL (US)

( * ) Notice: Subject to any disclaimer, the term of this patent is extended or adjusted under 35 U.S.C. 154(b) by 332 days.

(21) Appl. No.: 16/149,727

(22) Filed: Oct. 2, 2018

(65) Prior Publication Data

US 2020/0105147 A1 Apr. 2, 2020

(51) Int. Cl.
*G08G 5/00* (2006.01)

(52) U.S. Cl.
CPC ......... *G08G 5/0034* (2013.01); *G08G 5/0021* (2013.01); *G08G 5/0039* (2013.01); *G08G 5/0052* (2013.01)

(58) Field of Classification Search
CPC .. G08G 5/0034; G08G 5/0021; G08G 5/0039; G08G 5/0052; G08G 5/0026; G01C 21/20; G06Q 10/047; G06Q 10/06312; G06Q 50/30
USPC .......................................................... 701/120
See application file for complete search history.

(56) References Cited

U.S. PATENT DOCUMENTS 9,132,913 B1 * 9/2015 Shapiro .................. G05D 1/106

OTHER PUBLICATIONS

D.R. Jones, C.D. Perttunen, & B. E. Stuckman, "Lipschitzian Optimization without the Lipschitz Constant," J. of optimization Theory and Application, vol. 79, No. 1, pp. 157-181, (1993).
Bartholomew-Biggs, Parkhurst, Wilson, "Global Optimization Approaches to an Aircraft Routing Problem," European J. of Operational Research, vol. 146, No. 2 (2003).
Extended European Search Report for Application No. 19195879.2-1293 dated Mar. 13, 2020.

* cited by examiner

*Primary Examiner* — Paula L Schneider
(74) *Attorney, Agent, or Firm* — Patterson + Sheridan, LLP (57) ABSTRACT

Embodiments provide for vertical flight path optimization by generating a plurality of waypoints with allowable parameters for a flightpath at which a course, including elements for heading, altitude, and speed, of an aircraft is adjustable; calculating a number of unique trajectories available based on the plurality of waypoints; when the number of unique trajectories is greater than a threshold number of trajectories, performing a probabilistic assessment of the unique trajectories to identify an elite set of trajectories that include those trajectories with efficiency metrics within an upper range of a set of assessed trajectories; identifying mobile waypoints in trajectories of the elite set of trajectories; performing a global optimal path assessment, wherein positions of mobile waypoints are adjusted within an associated trajectory to identify an optimal trajectory for the aircraft on the flightpath; and providing the optimal trajectory to the aircraft to follow the flightpath according to the optimal trajectory.

20 Claims, 9 Drawing Sheets

VERTICAL FLIGHTPATH OPTIMIZATION

FIELD

Aspects of the present disclosure provide improved systems and methods for the optimization of aircraft flight paths based on various parameters.

BACKGROUND

The present disclosure relates to flightpath optimization, and more specifically, to optimizing the altitude and the speed of an aircraft at various sections of the flightpath to account for various parameters by which the efficiency of the aircraft is measured. A flightpath includes a trajectory, which indicates the altitude and the speed of the aircraft over the course of the flightpath. As will be appreciated, the altitude and speed of an aircraft may vary over the course of a journey from takeoff to landing, but aircraft generally climb/descend to a specified altitude and maintain a specified speed on a specified heading for an extended period of time. Changes in altitude or speed may affect how quickly an aircraft reaches the destination, an amount of fuel consumed, a level of noise produced (in the cabin or the environment), which weather patterns the aircraft interacts with, and a level of wear-and-tear on components of the aircraft, among other effects. Different operators may prioritize increasing or decreasing the values of various parameters relative to one another when setting a flightpath, however, generating a flightpath optimized according to an operator's preferences from the available options can be a time and processor-resource intensive operation.

SUMMARY

The present disclosure provides in one aspect a method for vertical flightpath optimization, the method comprising: generating a plurality of waypoints with allowable parameters for a flightpath at which a course, including elements for heading, altitude, and speed, of an aircraft is adjustable; calculating a number of unique trajectories available based on the plurality of waypoints; in response to determining that the number of unique trajectories is greater than a threshold number of trajectories, performing a probabilistic assessment of the unique trajectories to identify an elite set of trajectories that include those trajectories with efficiency metrics within an upper range of a set of assessed trajectories; identifying mobile waypoints in trajectories of the elite set of trajectories; performing a global optimal path assessment, wherein positions of mobile waypoints are adjusted within an associated trajectory to identify an optimal trajectory for the aircraft on the flightpath; and providing the optimal trajectory to the aircraft to follow the flightpath according to the optimal trajectory.

In another aspect, in combination with any example method above or below, the method further comprises, in response to determining that the number of unique trajectories is less than the threshold number of trajectories: generating an exhaustive set of trajectories corresponding to the unique trajectories; and performing an exhaustive assessment on the exhaustive set of trajectories to identify the elite set of trajectories that that include those trajectories with efficiency metrics within an upper range of the set of exhaustive trajectories.

In another aspect, in combination with any example method above or below, the probabilistic assessment of the method further comprises: generating an initial parameter probability distribution from the plurality of waypoints; generating a probabilistic set of trajectories of a predefined number based on the initial parameter probability distribution; and selecting the elite set of trajectories from the probabilistic set of trajectories.

In another aspect, in combination with any example method above or below, selecting the elite set of trajectories from the probabilistic set of trajectories in the method further comprises the method further comprises: generating a subsequent parameter probability distribution from waypoints included in the elite set of trajectories; generating a subsequent probabilistic set of trajectories of the predefined number based on the subsequent parameter probability distribution; and selecting new set of trajectories from the subsequent probabilistic set of trajectories as the elite set of trajectories.

In another aspect, in combination with any example method above or below, the mobile waypoints are waypoints at which at least one element of the course is adjusted in a particular trajectory of the elite set of trajectories; and waypoints in the particular trajectory at which least one of the elements of the course is not adjusted are removed from the particular trajectory when performing the global optimal path assessment.

In another aspect, in combination with any example method above or below, the positions of the mobile waypoints are adjusted within the associated trajectory within a range on the trajectory defined by a halfway-points between the mobile waypoints.

In another aspect, in combination with any example method above or below, the waypoints with allowable parameters specify at least one criterion selected from the group comprising: a longitude; a latitude; an in-cabin noise level; an environmental noise level; an available thrust for the aircraft; an elapsed flight time; a sea-level altitude for the aircraft; a ground-level altitude for the aircraft; a weight of the aircraft; and an operational event for the aircraft.

The present disclosure provides in one aspect a system for vertical flight path optimization, the system comprising: a processor; a memory, including instructions that when executed by the processor enable the system to: generate a plurality of waypoints with allowable parameters for a flightpath at which a course, including elements for heading, altitude, and speed, of an aircraft is adjustable; calculate a number of unique trajectories available based on the plurality of waypoints; in response to determining that the number of unique trajectories is greater than a threshold number of trajectories, perform a probabilistic assessment of the unique trajectories to identify an elite set of trajectories that include those trajectories with efficiency metrics within an upper range of a set of assessed trajectories; identify mobile waypoints in trajectories of the elite set of trajectories; perform a global optimal path assessment, wherein positions of mobile waypoints are adjusted within an associated trajectory to identify an optimal trajectory for the aircraft on the flightpath; and provide the optimal trajectory to the aircraft to follow the flightpath according to the optimal trajectory.

In another aspect, in combination with any example system above or below, in response to determining that the number of unique trajectories is less than the threshold number of trajectories the system is further enabled to: generate an exhaustive set of trajectories corresponding to the unique trajectories; and perform an exhaustive assessment on the exhaustive set of trajectories to identify the elite set of trajectories that include those trajectories with efficiency metrics within an upper range of the set of exhaustive trajectories.

In another aspect, in combination with any example system above or below, when performing the probabilistic assessment the system is further enabled to: generate an initial parameter probability distribution from the plurality of waypoints; generate a probabilistic set of trajectories of a predefined number based on the initial parameter probability distribution; and select the elite set of trajectories from the probabilistic set of trajectories.

In another aspect, in combination with any example system above or below, when selecting the elite set of trajectories from the probabilistic set of trajectories the system is further enabled to: generate a subsequent parameter probability distribution from waypoints included in the elite set of trajectories; generate a subsequent probabilistic set of trajectories of the predefined number based on the subsequent parameter probability distribution; and select a new set of trajectories from the subsequent probabilistic set of trajectories as the elite set of trajectories.

In another aspect, in combination with any example system above or below, the mobile waypoints are waypoints at which at least one element of the course is adjusted in a particular trajectory of the elite set of trajectories; and waypoints in the particular trajectory at which least one of the elements of the course is not adjusted are removed from the particular trajectory when performing the global optimal path assessment.

In another aspect, in combination with an example system above or below the positions of the mobile waypoints are adjusted within the associated trajectory within a range on the trajectory defined by a halfway-points between the mobile waypoints.

In another aspect, in combination with any example system above or below the waypoints with allowable parameters specify at least one criterion selected from the group comprising: a longitude; a latitude; an in-cabin noise level; an environmental noise level; an available thrust for the aircraft; an elapsed flight time; a sea-level altitude for the aircraft; a ground-level altitude for the aircraft; a weight of the aircraft; and an operational event for the aircraft.

The present disclosure provides in one aspect a non-transitory computer readable medium including instructions that when executed by a processor enable the processor to perform an operation for vertical flightpath optimization, the operation comprising: generating a plurality of waypoints with allowable parameters for a flightpath at which a course, including elements for heading, altitude, and speed, of an aircraft is adjustable; calculating a number of unique trajectories available based on the plurality of waypoints; in response to determining that the number of unique trajectories is greater than a threshold number of trajectories, performing a probabilistic assessment of the unique trajectories to identify an elite set of trajectories that include those trajectories with efficiency metrics within an upper range of a set of assessed trajectories; identifying mobile waypoints in trajectories of the elite set of trajectories; performing a global optimal path assessment, wherein positions of mobile waypoints are adjusted within an associated trajectory to identify an optimal trajectory for the aircraft on the flightpath; and providing the optimal trajectory to the aircraft to follow the flightpath according to the optimal trajectory.

In another aspect, in combination with any example computer readable medium above or below, in response to determining that the number of unique trajectories is less than the threshold number of trajectories: generating an exhaustive set of trajectories corresponding to the unique trajectories; and performing an exhaustive assessment on the exhaustive set of trajectories to identify the elite set of trajectories that include those trajectories with efficiency metrics within an upper range of the set of exhaustive trajectories.

In another aspect, in combination with any example computer readable medium above or below, the probabilistic assessment further comprises: generating an initial parameter probability distribution from the plurality of waypoints; generating a probabilistic set of trajectories of a predefined number based on the initial parameter probability distribution; and selecting the elite set of trajectories from the probabilistic set of trajectories.

In another aspect, in combination with any example computer readable medium above or below, selecting the elite set of trajectories from the probabilistic set of trajectories further comprises: generating a subsequent parameter probability distribution from waypoints included in the elite set of trajectories; generating a subsequent probabilistic set of trajectories of the predefined number based on the subsequent parameter probability distribution; and selecting a new set of trajectories from the subsequent probabilistic set of trajectories as the elite set of trajectories.

In another aspect, in combination with any example computer readable medium above or below, the mobile waypoints are waypoints at which at least one element of the course is adjusted in a particular trajectory of the elite set of trajectories; and waypoints in the particular trajectory at which least one of the elements of the course is not adjusted are removed from the particular trajectory when performing the global optimal path assessment.

In another aspect, in combination with any example computer readable medium above or below, the positions of the mobile waypoints are adjusted within the associated trajectory within a range on the trajectory defined by a halfway-points between the mobile waypoints.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure relates to improved systems and methods for optimizing flightpaths for aircraft. A flightpath generally defines the route an aircraft takes from a first point to a second point, and the aircraft may vary the speed and altitude traveled at (referred to as a trajectory) over that flightpath to affect various parameters associated with the flight. Aircraft generally alter one or more of heading, altitude and speed at points in the flightpath referred to as waypoints. The number of potential waypoints at which an aircraft can adjust heading/altitude/speed and the range of allowable waypoint parameters that can be adjusted to present a pool of possible trajectories that may be too large to effectively analyze for an optimal trajectory that maximizes the efficiency merit for a flight. In cases where the pool is small enough, an exhaustive analysis may be performed (score and rank all possibilities), but larger pools may be analyzed based on a probabilistically representative sample set. Several iterations of the probabilistic set may be analyzed until diminishing returns in efficiency gains are noted, and the current iteration's set are then scored and ranked. Once analyzed, either exhaustively or probabilistically, an "elite" set of trajectories that have the best efficiency merits are identified. To further streamline processing, any waypoint that is not associated with a change in heading/altitude/speed in an elite trajectory may be disregarded in further analysis. The remaining waypoints are "mobile" and their positions in the elite trajectories are adjusted during a maximization analysis to find the trajectory that produces the "best" flightpath for an operator's needs. That trajectory can then be assigned to an autopilot to follow when guiding the aircraft over the flightpath.

As will be appreciated, the present disclosure provides improvements in computing devices involved in generating and using optimized flightpaths via a novel process that is markedly different than the generation processes used in prior systems by enabling a probabilistic search with enhanced accuracy and precision, rather than relying on brute force analysis of the dataset or a sampled subset thereof. The improvements provided include, but are not limited to: using fewer processing resources and memory storage space to handle the analysis of equivalently large datasets, the faster and more flexible generation of flightpaths (enabling mid-flight updates for a flightpath), and other benefits.

As used herein, an operator may refer to a pilot or crewmember of an aircraft, an operator of an aircraft (e.g., an airline), an Air Traffic Controller (ATC), or a group of coordinated ATCs. An operator may use one or more computing devices to perform one or more tasks including the methods discussed herein. A computing device includes a processor and a memory storage device including instructions contained thereon that are executable by the processor to enable the computing device to perform various actions. Examples of computing devices include servers, personal computing devices (e.g., towers, laptops, smart phones, tablets), aircraft control computing devices (e.g., a computing system providing control and sensor interfaces and autopilot functionality for an aircraft), flight control computing devices (e.g., a computing system providing command and control interfaces for an airspace), etc.

As used herein, a waypoint refers to a set of defined conditions experienced within a flight plan at which an aircraft can initiate a change of heading, speed, and/or altitude. Waypoint parameters describe various physical representations of the aircraft, airspace, atmosphere, or flight state at some point in the flightpath that the conditions are measured against. In some aspects, the condition may be satisfied with one or more locational coordinates (e.g., latitude, longitude, altitude relative to sea level, altitude relative to ground). In other aspects, the condition may be satisfied with various characteristics of the aircraft (e.g., weight, available thrust, pitch). In further aspects, the condition may be satisfied with various events occurring (e.g., landing gear deployment, flaps down, time since takeoff). A waypoint may include one or more waypoint parameter (e.g., latitude and longitude, latitude and weight, available thrust and time since takeoff), and each waypoint in a flight plan may specify the same or different waypoint parameters. Although waypoints may be referred to in relation to a "position" or "point" in a flightpath and relative to one another, it will be understood that waypoints are not limited to locational criteria but are multi-dimensional descriptions of aircraft, airspace, atmosphere, or flightpath characteristics, and that the "position" or "point" in the flightpath may refer to a completion percentage of the associated flightpath where a given waypoint parameter set is expected to be satisfied within the course of the flightpath.

As used herein, an efficiency merit refers to a combined weighted score of various waypoint parameters associated with a flight plan to describe quantitative and qualitative measures of flight efficiency as related to operational, scheduling, regulatory, and reputational constraints. For example, a fuel use rate, an impact of scheduling change (e.g., a number of passengers who will miss a connecting flight if arriving late, whether arriving early has a positive effect), an on-duty time for flight crew, a noise level (e.g., internal cabin dB or groundside dB), a wear-and-tear metric, etc. may each be included when considered an efficiency merit for a particular trajectory. The waypoint parameters may address issues related to aircraft performance, operational management, passenger comfort, and environmental impact, among other concerns. At various points in the flight plan, one or more waypoint parameters may oppose one another in optimizing the efficiency merit. For example, a lower altitude and a higher speed may increase a noise level detected on the ground, which the operator of the aircraft may wish to minimize to reduce impact of flight operations on persons living under the flightpath. However, flying at a higher altitude may cause the aircraft to experience turbulence (which the operator wishes to reduce to improve passenger comfort) and flying at a lower speed may induce longer flights (which the operator also wishes to reduce to improve operational management). Optimizing the counteracting parameters according to the operator's preferences may weight different parameters differently at various points of the flightpath. For example, a parameter for external noise levels may be weighted lowest from 0 miles to X miles away from airports and highest within a range from X miles to Y miles away from an airport.

Figure 1:
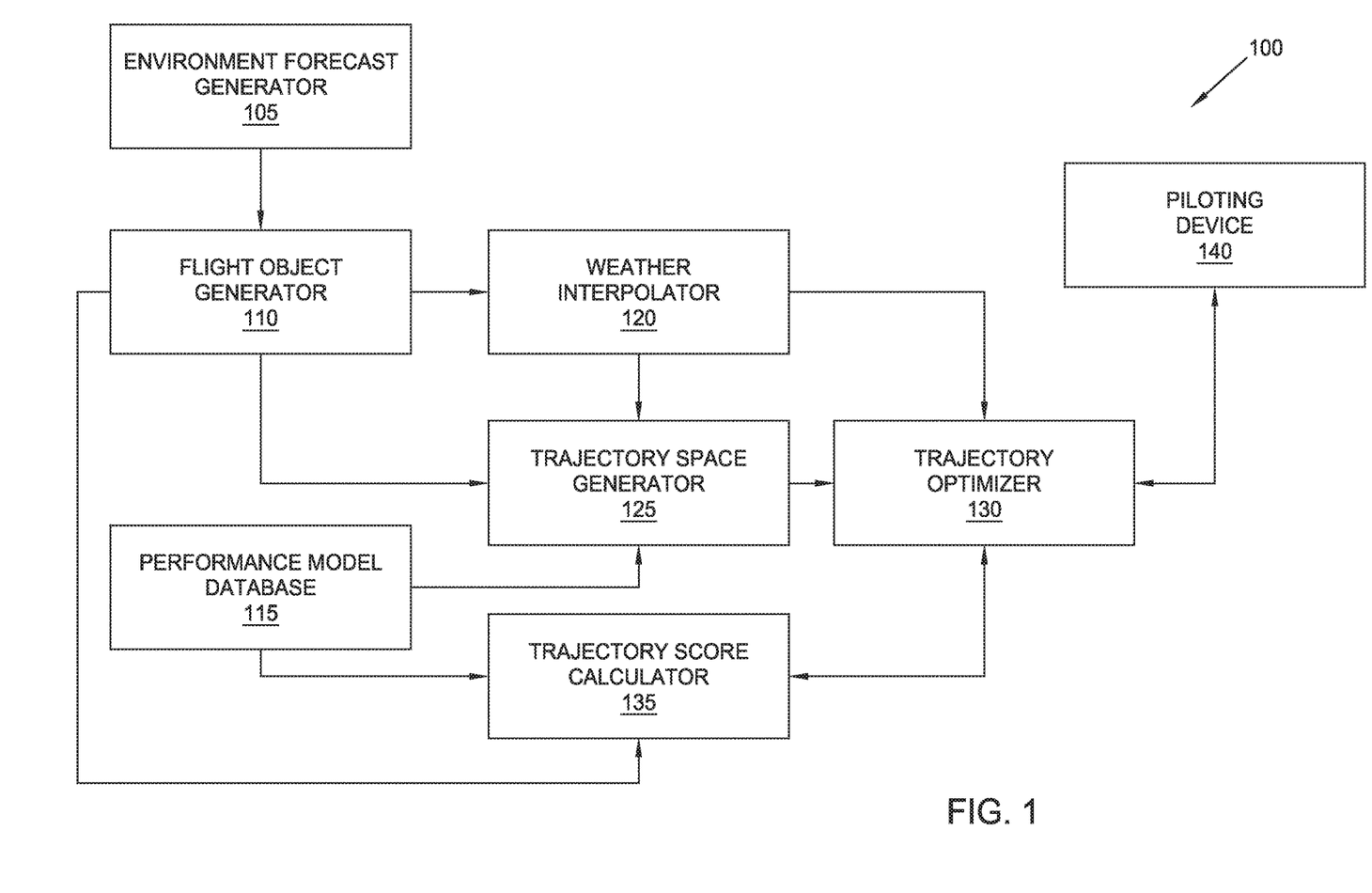
FIG. 1 illustrates components for a system architecture to provide vertical flightpath optimization, according to aspects of the present disclosure.

In reference now to FIG. 1, an architecture 100 is illustrated that shows components for a system to provide vertical flightpath optimization. The architecture 100 may include one or more computing devices provided by one or more operators to provide the features and actions described herein. In various aspects, the architecture 100 represents a single computer system, while in other aspects the architecture 100 is provided by several computer systems working in a networked or connected environment, for example, via the Internet, a Local Area Network, an ad hoc wired network or the like.

An environmental forecast generator 105 receives weather and air-traffic forecast information from various external data sources to map the flightpath for analysis. The external data sources may include ATC flight maps, flight plan databases, weather services, and other entities that provide information on the environment in which the aircraft will fly. In some aspects, the environmental forecast generator 105 produces a four-dimensional grid of the weather features in the flightpath, including the turbulence, wind speed, wind direction, and temperature. In various aspects, the environmental forecast generator 150 produces a scheduling difference probability for various sectors of airspace and airports along the flightpath and produces a timing impact table that associates the effects on the efficiency merit for the given flightpath of arriving at the destination or waypoints at various times other than the scheduled time of arrival. For example, arriving at the destination airport X minutes early may have a small positive effect of the efficiency merit, arriving on-time or up to Y minutes late may have no or negligible effect on the efficiency merit, but arriving Z minutes late or later may have a large negative effect on the efficiency merit to encourage the generation of flightpaths resulting in punctual flights.

A flight object generator 110 receives flight plans generated by operators in various formats and the atmospheric information generated by the environmental forecast generator 105. When generating a flight plan with an optimized trajectory for a given aircraft, the flight object generator 110 generates a flight object that specifies the initial aircraft conditions (e.g., aircraft type, fuel load, weight, weight distribution), required waypoints, a subset of the weather and forecast map that the flightpath passes through (e.g. within 50 miles from a designated pathway), and the timing impact table.

A performance model database 115 stores data related to the performance criteria of various aircraft. These data include, but are not limited to: aircraft type, passenger count, crew count, flight schedules, fuel consumption rates, altitude envelopes, speed profiles, acceleration/deceleration curves, allowable climb/descent rates, cabin profiles, engine type and number, fuel load, etc.

A weather interpolator 120 receives weather data from the flight object generator 110 and computers the most probable weather conditions at a given points inside and around a weather pattern. For example, a weather cell (e.g., a cloudbank, low/high pressure zone) may be indicated in the weather data as overlaying certain coordinates, and the weather interpolator 120 calculates the: wind speeds; wind directions; likelihoods and strengths of updrafts and downdrafts; regionalized chances of rain, snow, hail, ice, and/or lightning; etc. at various coordinates corresponding to the weather cell.

A trajectory space generator 125 breaks the horizontal elements of the flightpath into segments with various waypoints spaced along the course of the flightpath at which the aircraft may adjust speed and/or altitude along the pathway. The waypoints may include operator specified waypoints and waypoints created by the trajectory space generator 125. At each waypoint, the trajectory space generator 125 determines the range of allowable altitudes and speeds for the aircraft based on flight control restrictions (e.g., restricted airspace, commuter flights are limited to one altitude bands and long-haul flights to another), environmental factors (e.g., buildings or mountains may set a safety floor for a lower-bound on altitude), and performance factors (e.g., an aircraft may be certified to operate at various altitudes and speeds, and not operate at others due to mechanical or operational-efficiency data).

The trajectory optimizer 130 searches within the range of allowable altitudes and speeds for each available waypoint to identify the "best" trajectory to satisfy the operator's preferences. The trajectory optimizer 130 receives the interpolated weather map from the weather interpolator 120, the waypoints and ranges of values for those waypoints from the trajectory space generator 125, and communicates with the trajectory score calculator 135 to determine which trajectories most fully satisfy the operator's preferences.

A trajectory score calculator 135 receives a trajectory optimized by the trajectory optimizer 130 and the initial aircraft conditions from the flight object generator 110, and computes the efficiency merit for that trajectory. An operator sets the trajectory score calculator 135 to weight the various parameters according to the operator's preferences. For example, one operator may set the trajectory score calculator 135 to prioritize passenger comfort (e.g., keep in-cabin noise below a threshold, avoid turbulence, keep ascents/descents below a threshold pitch) while another operator may set the trajectory score calculator 1350 to prioritize fuel efficiency. The trajectory score calculator 135 provides the scores for the efficiency merits of various trajectories to the trajectory optimizer 130 so that the trajectory optimizer 130 may select the elite set of trajectories, perform recursive rounds of probabilistic analysis, and output an optimized trajectory to a piloting device 140.

One or more piloting devices 140 may be in communication with the trajectory optimizer 130 to request and/or received an optimized flightpath and trajectory from the trajectory optimizer 130. Piloting devices 140 may include hand-held or personal devices (such as a pilot's tablet, dispatcher's workstation, or onboard avionics), to request and review various flightpaths by an aircraft crewmember, a flight management computer (including an autopilot) used in the aircraft to interface with the flight controls of the aircraft and automate the operation of the aircraft to follow a supplied flightpath, airline and ATC operations devices, and the like. In various aspects, more than one piloting device 140 may receive the optimized flightpath requested by one piloting device 140.

Figure 2:
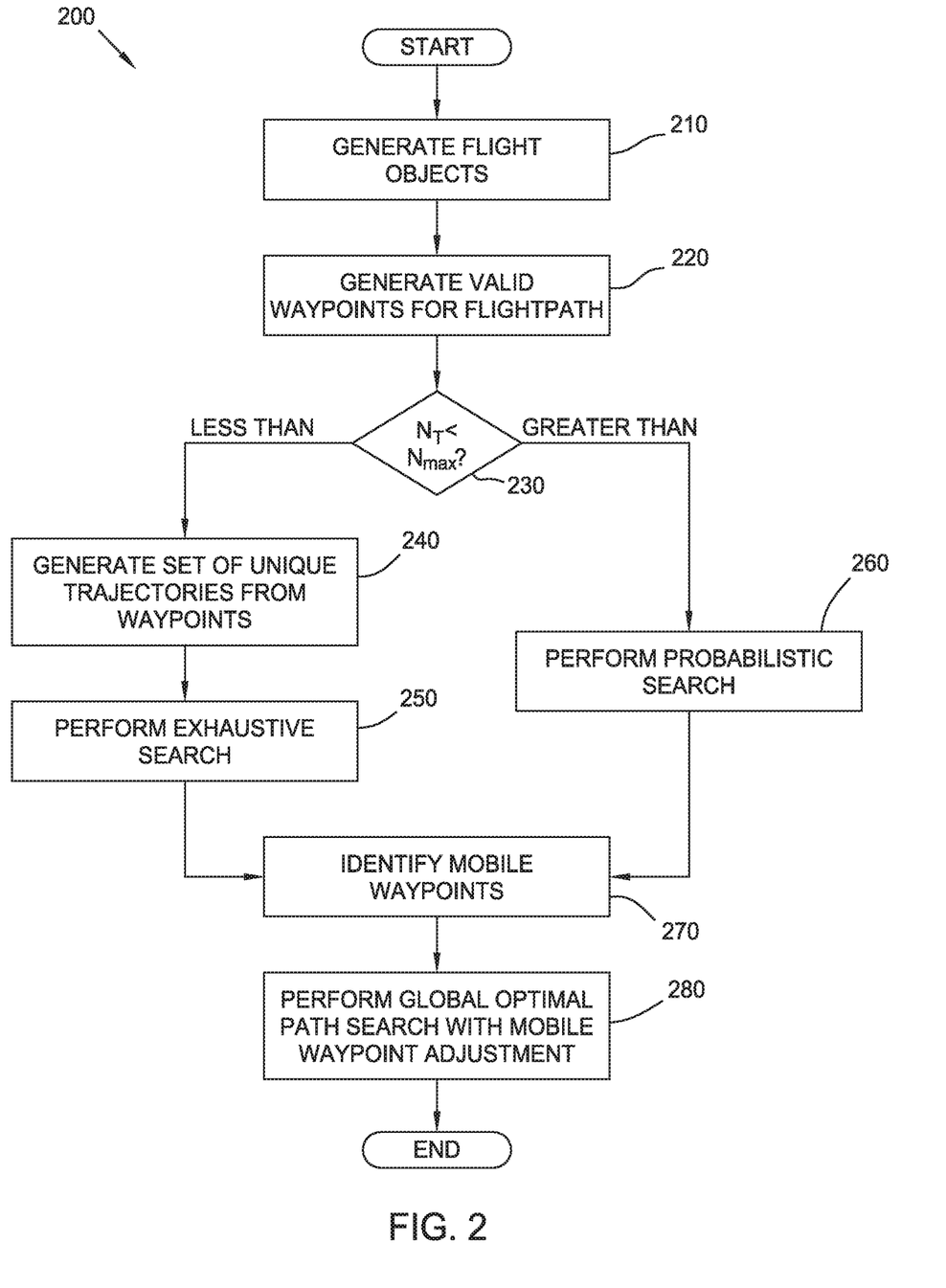
FIG. 2 is a flowchart of a method for optimizing vertical flightpaths, according to aspects of the present disclosure.

FIG. 2 is a flowchart of a method 200 for optimizing vertical flightpaths. Method 200 begins with block 210, where the flight object generator 110 generates the flight object(s) for a given flightpath. The flight object generator 110 receives a flight plan generated by an operator, collects weather forecast data relevant for the flight plan, and analyzes the distances, weather, and traffic between waypoints to produce a set of waypoints where the elements of the course in the flight (i.e., heading, altitude, and/or speed) can change.

At block 220, the trajectory space generator 125 generates a plurality of waypoints with values within the allowable set of performance parameters for the aircraft along the flightpath. This set of waypoints sets out the potential combinations of heading, speed, and altitude that the aircraft can operate at. For example, a performance envelope for a given aircraft may specify a maximum climb/descent/turn rate, stall speed, cruising speed, maximum speed, etc. at various altitudes that the aircraft is certified/allowed to operate in. In some aspects, an operator may set a minimum altitude and/or speed and/or a maximum altitude and/or speed based on efficiency considerations.

At block 230, the trajectory optimizer 130 determines whether the total number of unique trajectories ($N_T$) that may be constructed from the allowable parameter set is greater than or less than a threshold number of trajectories ($N_{max}$). In response to determining that $N_T$ is less than (or equal to) $N_{max}$, method 200 proceeds to block 240. In response to determining that $N_T$ is greater than $N_{max}$, method 200 proceeds to block 260.

At block 240, the trajectory optimizer 130 generates the set of unique trajectories from the allowable waypoint parameter values, and, at block 250, performs an exhaustive assessment of the set of unique trajectories. In an exhaustive assessment, the trajectory optimizer 130 and the trajectory score calculator 135 analyze the efficiency merit for each trajectory of the set of unique trajectories using the weights and parameters specified by the operator to return a set of elite trajectories. The elite trajectories are a predefined number (e.g., x) trajectories of the analyzed set that have the x-highest efficiency merits as determined by the trajectory score calculator 135. Method 200 proceeds to block 270 after block 250.

At block 260, the trajectory optimizer 130 and the trajectory score calculator 135 perform a probabilistic assessment of the trajectories within the allowable waypoint parameter values. The probabilistic assessment, as may be described in greater detail in regard to FIG. 3, enables the computing device providing the trajectory optimizer 130 to save computing resources; instead of individually analyzing an arbitrarily large amount of trajectories above the threshold set by $N_{max}$ by the operator, the trajectory optimizer 130 analyzes a statistically representative set of trajectories over a series of iterations to refine what trajectories belong in the elite set of trajectories. By reducing the number of trajectories that are analyzed, the trajectory optimizer 130 may return results faster and enable additional functionality for the operators' devices in that flightpaths may be adjusted before flight and/or while the aircraft is in-flight as new data develop (e.g., as other aircraft adjust flightpaths, weather patterns shift).

At block 270, the trajectory optimizer 130 identifies mobile waypoints in the elite set of trajectories. The trajectory optimizer 130 removes waypoints from the elite trajectories at which the heading, speed, and altitude remain constant or that are mandated as required by the operator (i.e., the specified heading/speed/altitude must occur at the associated waypoint). Stated differently, those waypoints that are "static" in value for the trajectory are removed, and the remaining waypoints that the trajectory optimizer 130 has control over and specifies a course change in one or more of heading, altitude, and speed in the elite trajectories are retained for optimization by the trajectory optimizer 130.

The trajectory optimizer 130 identifies ranges that these mobile waypoints may be moved within the flightpath. The trajectory optimizer 130 may use a preset distance, the presence of a static waypoint and/or a radial distance to another mobile waypoint to identify a range for a given mobile waypoint. For example, the trajectory optimizer 130 may identify a distance range for a locational waypoint that allows for the locational waypoint to occur X miles ahead or after the initially specified location. In another aspect, the position of a mobile waypoint in the course of the flightpath may be adjusted until a static waypoint is reached or a midpoint between the mobile waypoint and a neighboring waypoint is reached.

At block 280, the trajectory optimizer 130 performs a global assessment of the multidimensional space defined for the flightpath by the ranges of the mobile waypoints determined at block 270. The trajectory optimizer 130 retains the values of the heading, altitude, and speed that the aircraft is to change to at the mobile waypoints, but varies where those changes occur within the flightpath. In some aspects, the trajectory optimizer 130 performs the global assessment via the DIRECT algorithm, or another global maxima/minima detection algorithm known to those of ordinary skill in the art to detect the series of positions for the mobile positions among the elite trajectories that maximize the efficiency merit.

Once identified, the trajectory optimizer 130 transmits the optimal trajectory (i.e., the trajectory determined to have the highest efficiency merit) and the positions and values of the waypoints therein to one or more piloting devices 140. For example, an autopilot of the aircraft for which the optimized flightpath was requested can receive the flightpath to thereby control the aircraft to follow the flightpath according to the optimal trajectory. In a further example, a pilot may request several flightpaths optimized via different efficiency merit element weightings (e.g., to prioritize one of passenger comfort, short duration flights, fuel efficiency, etc.) and select one of the several flightpaths for the aircraft to use. In another example, the piloting device 140 of an ATC device receives the optimized flightpath to re-route aircraft around a developing storm with minimal negative effect on those aircraft. The aircraft receives the selected optimized flightpath, and either directs the pilot to follow the flightpath and/or automatically follows the flightpath as optimized. Method 200 may then conclude.

Figure 3:
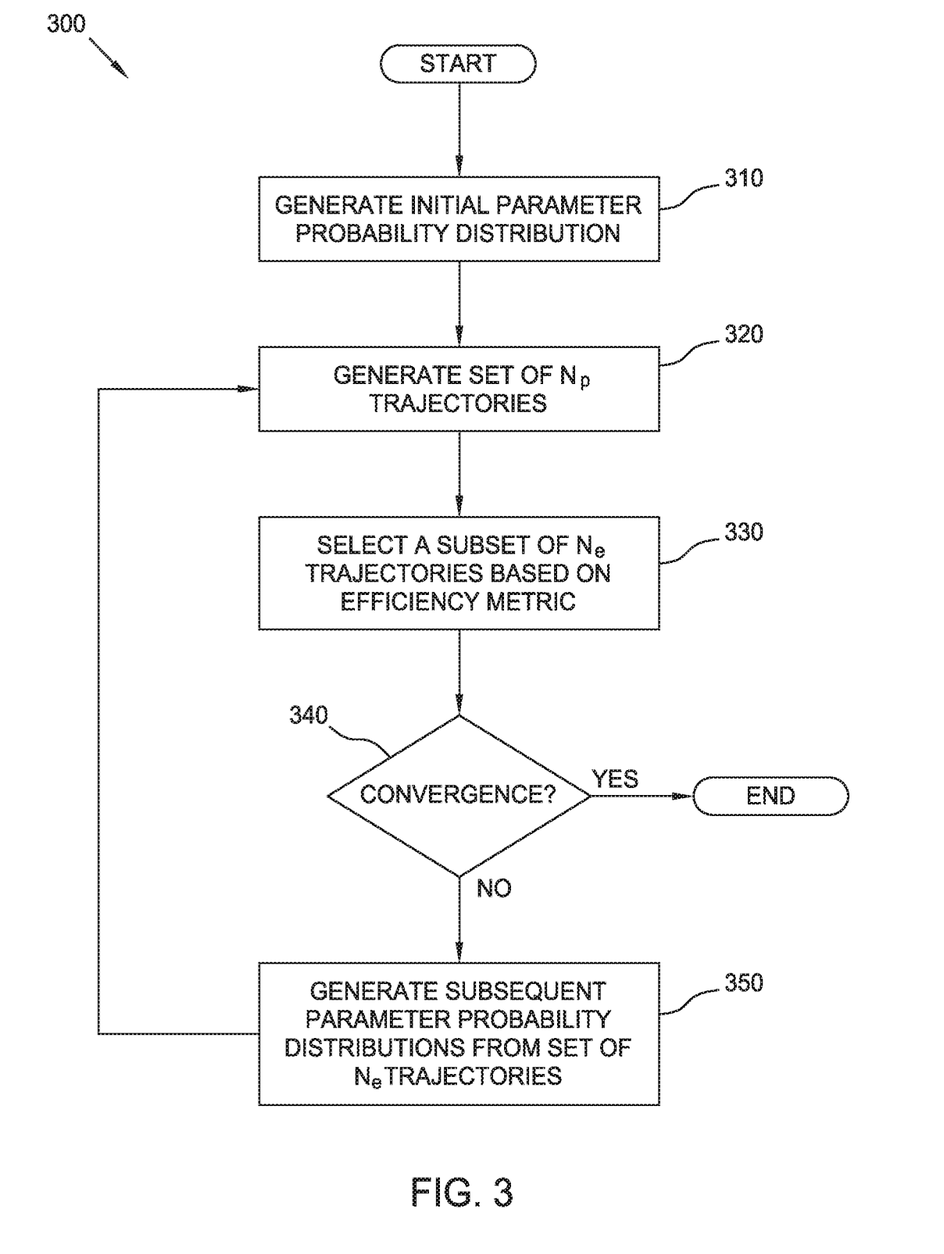
FIG. 3 is a flowchart of a method for performing a probabilistic assessment, according to aspects of the present disclosure.

FIG. 3 is a flowchart of a method 300 for performing a probabilistic assessment when optimizing vertical flightpaths. In some aspects, method 300 may be performed as part of block 260 of method 200 described in relation to FIG. 2.

At block 310, the trajectory optimizer 130 generates an initial parameter probability distribution from the allowable waypoint parameter values. The trajectory optimizer 130 surveys the values for the altitudes and speeds specified in each of the initial parameters (e.g., those parameters set at block 220 of method 200). The counts of each parameter value are tallied at each waypoint to determine what percentage of values a probabilistic set of trajectories needs to include to be representative of the exhaustive set. Table 1 and Table 2 illustrate different example counts of one hundred trajectories having three potential values for speed and for altitude respectively. Values for heading have been omitted in the current examples so as to not distract from the inventive concepts described, but heading values may be included in various aspects. The trajectory optimizer 130 may perform separate tallies of the parameter values to create separate tables that the probabilistic set of trajectories are to represent.

TABLE 1

| Waypoint 1 | Waypoint 2 | Waypoint 3 |
| --- | --- | --- |
| Speed 1 = 64 | Speed 1 = 18 | Speed 1 = 25 |
| Speed 2 = 18 | Speed 2 = 64 | Speed 2 = 25 |
| Speed 3 = 18 | Speed 3 = 18 | Speed 3 = 50 |

TABLE 2

| Waypoint 1 | Waypoint 2 | Waypoint 3 |
| --- | --- | --- |
| Altitude 1 = 10 | Altitude 1 = 0 | Altitude 1 = 5 |
| Altitude 2 = 20 | Altitude 2 = 50 | Altitude 2 = 90 |
| Altitude 3 = 70 | Altitude 3 = 50 | Altitude 3 = 5 |

At block 320, the trajectory optimizer 130 generates a set of probabilistic trajectories from the parameter probability distribution having a predefined number of trajectories ($N_P$). For example, a probabilistic set of trajectories generated by the trajectory optimizer 130 using the example distributions in Table 1 and Table 2 would include a predefined number of trajectories such that the probabilistic set of trajectories will have 64% of the speeds at waypoint$_1$ set to speed$_1$, 18% set to speed$_2$, and 18% set to speed$_3$, while also having 10% of the altitudes at waypoint$_1$ set to altitude$_1$, 20% set to altitude$_2$ and 70% set to altitude$_3$. The trajectory optimizer 130 generates the probabilistic set of trajectories to include similarly representative values for heading, speed, and altitude for all of the waypoints included in the trajectories.

At block 330, the trajectory score calculator 135 determines the efficiency metric for each of the trajectories in the probabilistic set of trajectories and identifies, based on the efficiency metric, a predefined number of trajectories (N$_e$) that are the "elite" subset of the probabilistic set of trajectories. These elite trajectories include the trajectories within the upper range of the set of assessed trajectories for the given iteration of blocks 320-350. Stated differently, the trajectory score calculator 135 selects N$_e$ trajectories from the probabilistic set of N$_P$ trajectories with the highest efficiency metrics, which may be output from method 300 or used as the basis for a subsequent set of probabilistic analysis.

At block 340, the trajectory optimizer 130 determines whether convergence has been reached. Convergence may be reached when the efficiency merit values for all trajectories in the elite set of trajectories exceed a predefined threshold, if a predefined number of iterations have occurred, or when an observed change in average efficiency merit values for the elite set of trajectories between iterations falls below a differential threshold. If convergence has been reached, method 300 may output the elite set of trajectories and conclude. If convergence has not been reached, method 300 proceeds to block 350.

At block 350, the trajectory optimizer 130 generates a subsequent parameter probability distribution from the elite set of N$_e$ trajectories. The trajectory optimizer 130 surveys the values for the altitudes and speeds specified in each of the elite trajectories. The counts of each parameter value are tallied at each waypoint to determine what percentage of values the subsequent probabilistic set of trajectories needs to include to be representative of the elite set. Method 300 returns to block 320 after block 350. The trajectory optimizer 130 may iterate through blocks 320-350 several times using the parameter probability distributions from the elite trajectories from the current iteration as the basis of the probabilistic set of N$_P$ trajectories in the next iteration.

Figure 4A:
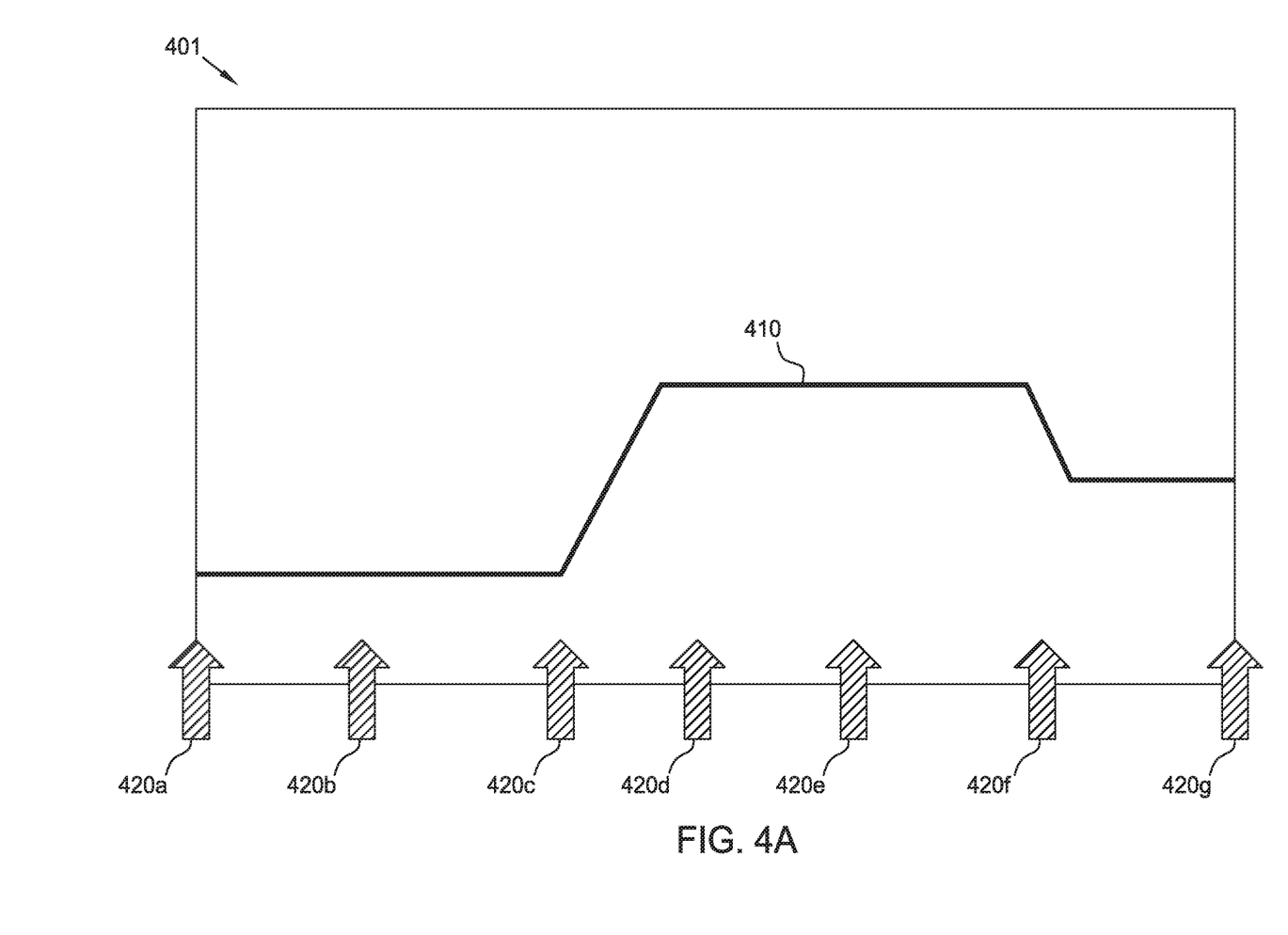
FIGS. 4A-C illustrate an example flightpath being optimized for a first element of a trajectory, according to aspects of the present disclosure.
Figure 4B:
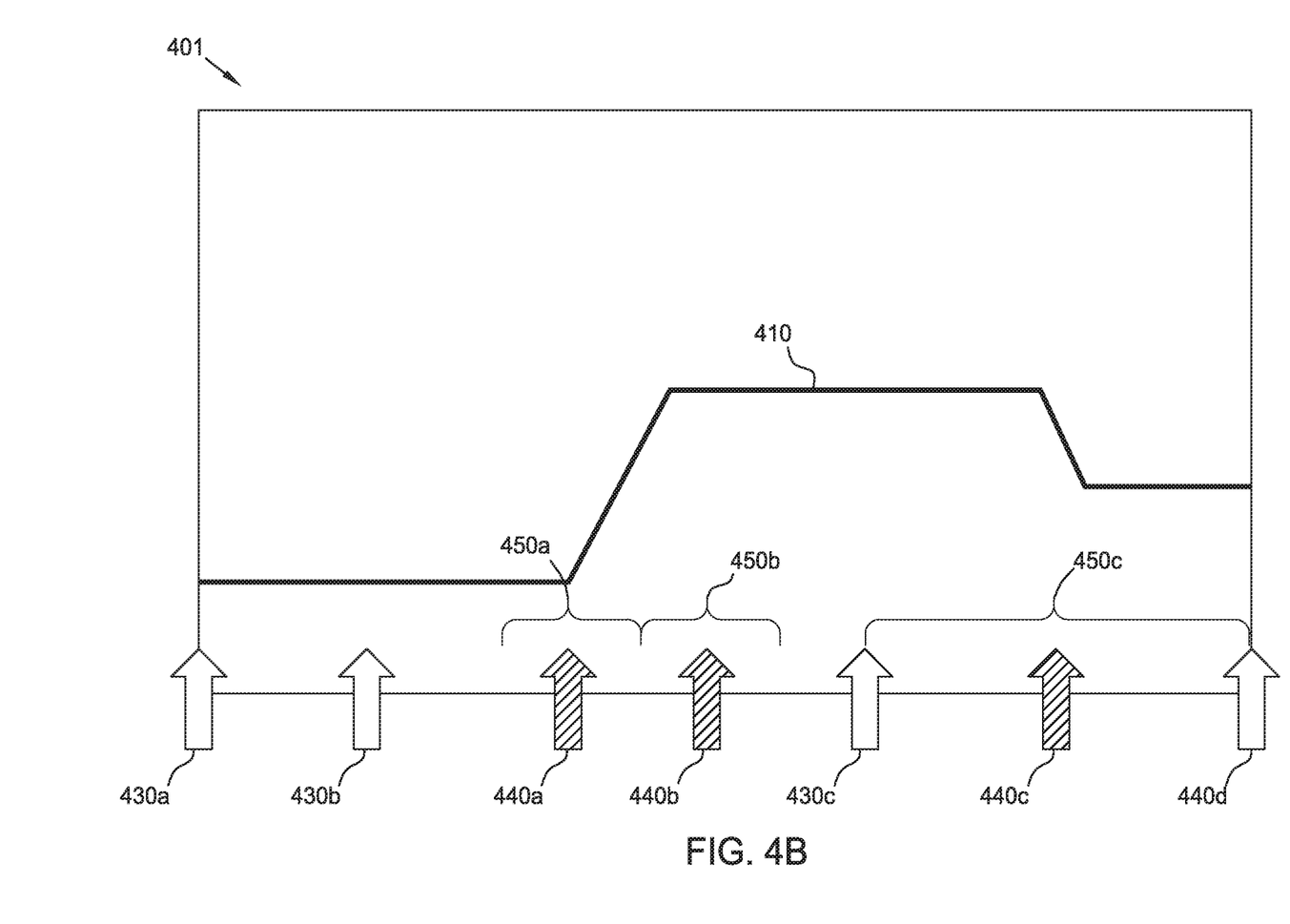
Figure 4C:
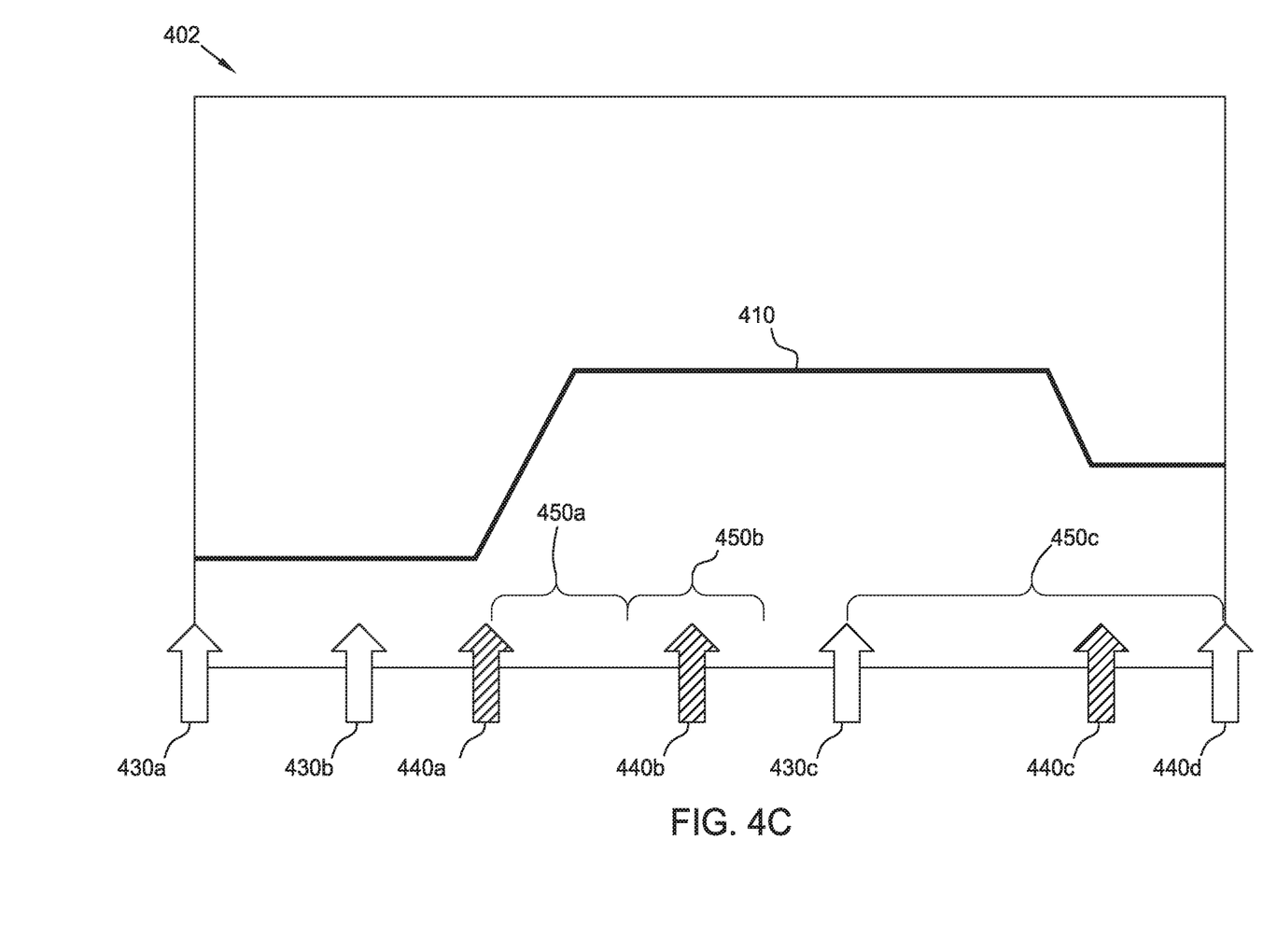
Figure 5A:
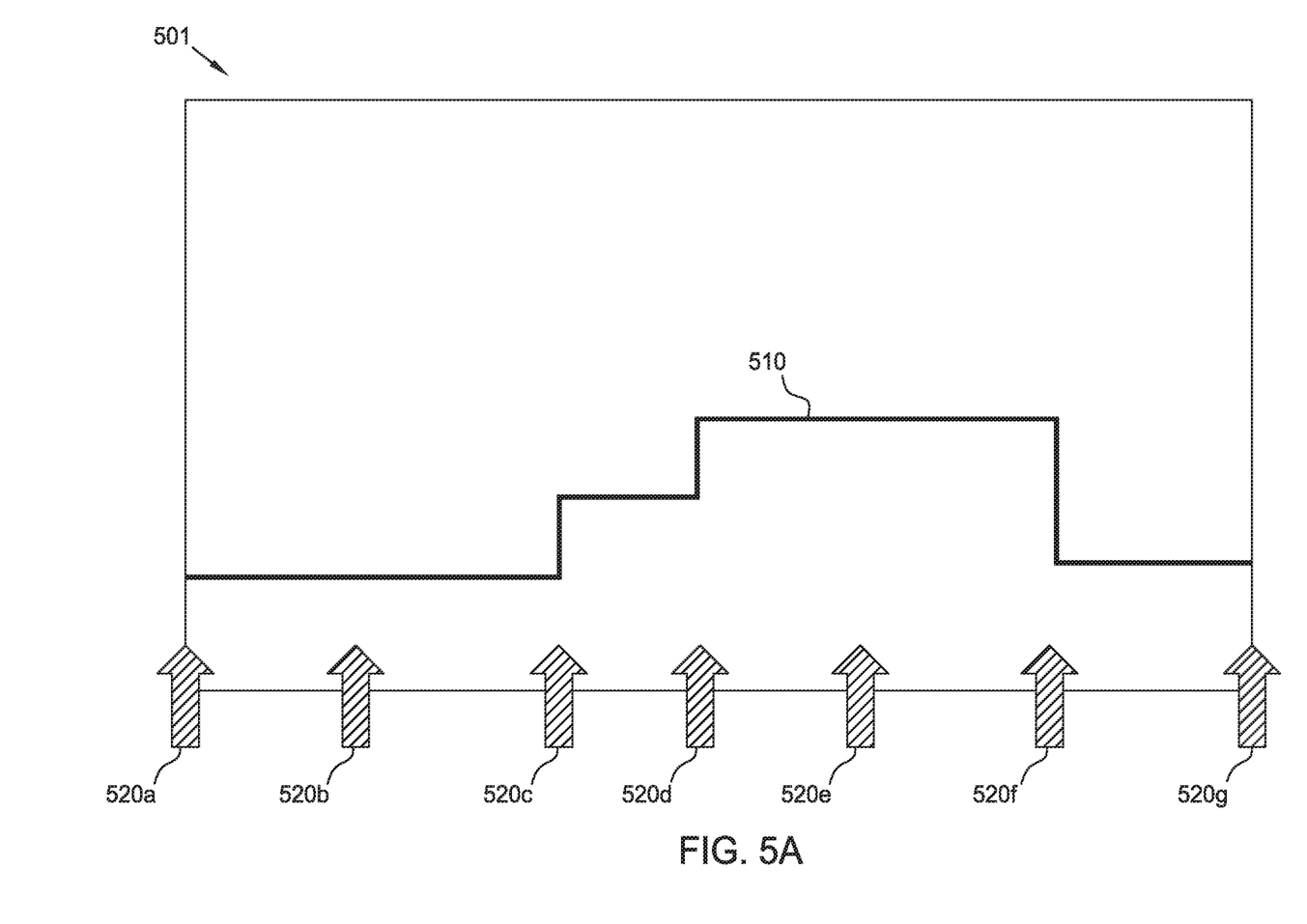
FIGS. 5A-C illustrate an example flightpath being optimized for a second element of a trajectory, according to aspects of the present disclosure.
Figure 5B:
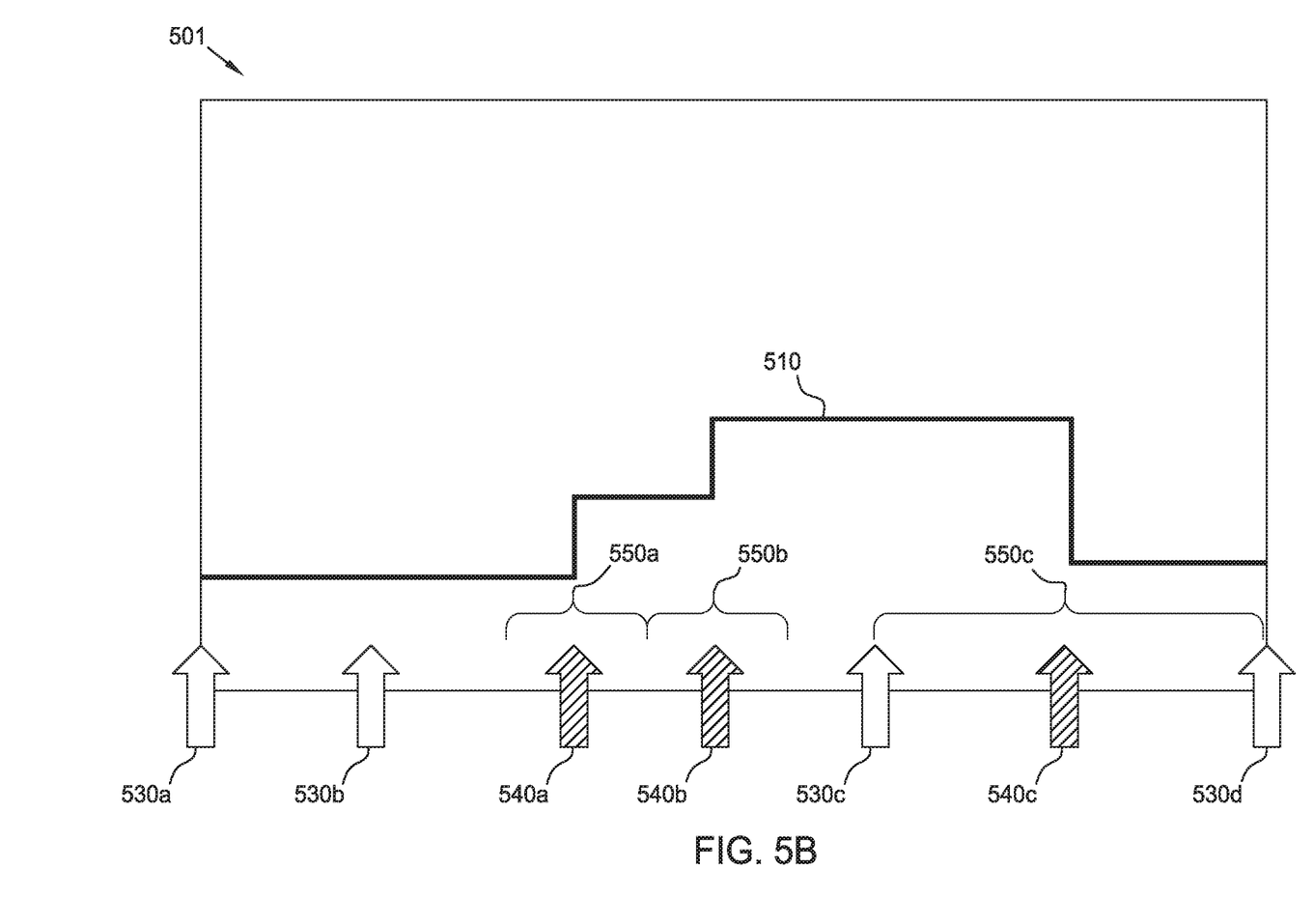
Figure 5C:
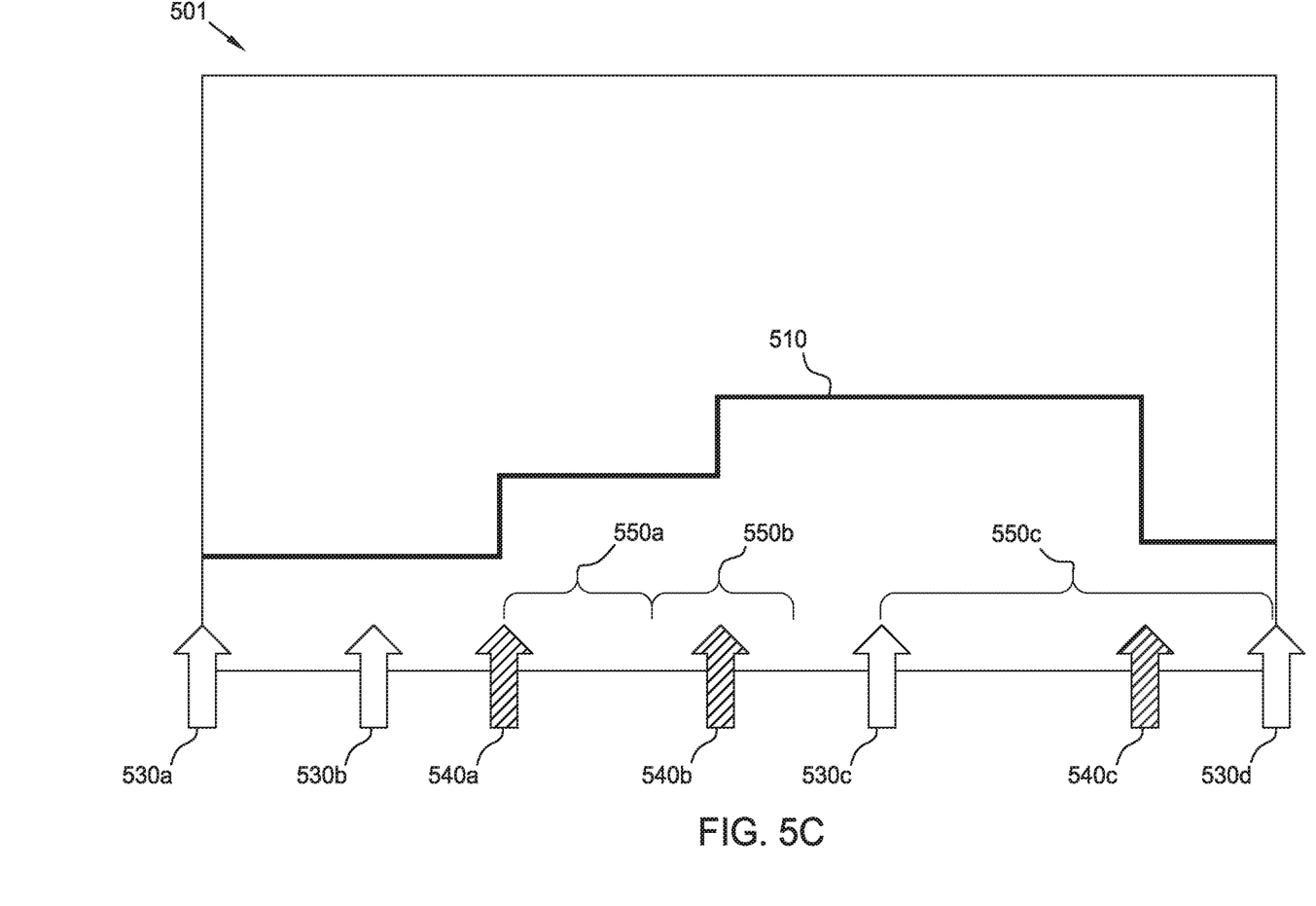

FIGS. 4A-C illustrate an example flightpath being optimized for one element of a trajectory. FIGS. 5A-C illustrate the example flightpath of FIGS. 4A-C optimized for a different element of the trajectory. FIG. 4A illustrates a first state 401 of a first flightpath element vector 410, which may by defined by one of the sets of elements of an elite trajectory (e.g., heading, speed, altitude). FIG. 5A illustrates a first state 501 of a second flightpath element vector 510, which is defined by a different one of the sets of elements of the elite trajectory illustrated in FIGS. 4A-C (e.g., heading or speed when altitude is illustrated in the first flightpath element vector 410). As will be appreciated, a flightpath includes elements of heading, altitude, and speed for the course of the flightpath; each of which may be visualized by a separate flightpath element vector 410/510. The first flightpath element vector 410 illustrated in FIGS. 4A-C represents the values for one element of the course; the other elements may be illustrated in similar one-element formats (e.g., as in FIGS. 5A-C) or several elements may be illustrated in a multi-dimensional space (e.g., 3 dimensional, 4 dimensional, 5 dimensional, etc.) in other aspects.

Along the first flightpath element vector 410, several waypoints 420a-g (generally, waypoints 420) are illustrated in FIG. 4A. Corresponding waypoints 520a-g (generally, waypoints 520) are illustrated in FIG. 5A. In FIG. 4B, the waypoints 420 are classified as either static waypoints 430a-d (generally, static waypoints 430) or mobile waypoints 440a-c (generally, mobile waypoints 440), which are illustrated with corresponding ranges 450a-c (generally, range 450). Similarly, in FIG. 5B, the waypoints 520 are classified as either static waypoints 530a-d (generally, static waypoints 530) or mobile waypoints 540a-c (generally, mobile waypoints 540), which are illustrated with corresponding ranges 550a-c (generally, range 550).

The static waypoints 430/530 represent waypoints 420/520 at which no change in any of the elements of the course defined by the trajectory being optimized occurs (e.g., a waypoint 420/520 where one or more of heading, altitude, or speed could have changed, but at which none of the elements change in the particular trajectory). The mobile waypoints 440/540 represent waypoints 420/520 at which the course is adjusted in the trajectory by one or more of heading, altitude, or speed. A course element may be altered for one element, as at waypoint 420d/520d, or for multiple elements, as at waypoints 420c/520c and 420f/520f. For instance, because the value of the element represented by the second flightpath element vector 510 changes at waypoint 520d, even though the value of the element represented by the first flightpath element vector 410 remains constant at waypoint 420d, the corresponding waypoints 420d/520d are classified as being mobile.

The mobile waypoints 440/540 are associated with ranges over which the position of the mobile waypoint 440/540 is varied to assess how to optimize the flightpath represented by the flightpath vectors 410/510. A search algorithm, such as the DIRECT algorithm, is used to find the positions within the space defined by the ranges 450/550 at which the mobile waypoints 440/540 may be moved in the trajectory's multidimensional space to maximize the calculated efficiency metric for the particular trajectory being optimized. The position that the mobile waypoints 440/540 in the second state 402/502 are moved in FIGS. 4C and 5C from starting positions in respective FIGS. 4B and 5B affect when/where the changes indicated by those mobile waypoints 440/540 occur in the flightpath.

Reference is made herein to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to aspects of the present invention, other and further aspects of the invention may be devised without departing from the basic scope thereof, and the scope thereof is determined by the claims that follow.

What is claimed is:

1. A method, comprising:
generating a plurality of waypoints with allowable parameters for a flightpath at which a course, including elements for heading, altitude, and speed, of an aircraft is adjustable;

calculating a number of trajectories available based on the plurality of waypoints;

in response to determining that the number of trajectories is greater than a threshold number of trajectories, performing a probabilistic assessment of the trajectories to identify an elite set of trajectories that includes a plurality of trajectories from a set of assessed trajectories with efficiency metrics having values above an upper range threshold;

differentiating mobile waypoints from static waypoints in the plurality of trajectories of the elite set of trajectories;

performing a global optimal path assessment, wherein positions of the mobile waypoints are adjusted within an associated trajectory to identify an optimal trajectory for the aircraft on the flightpath; and providing the optimal trajectory to the aircraft to follow the flightpath according to the optimal trajectory.

2. The method of claim 1, wherein, in response to determining that the number of trajectories is less than the threshold number of trajectories:

generating an exhaustive set of trajectories corresponding to the trajectories; and performing an exhaustive assessment on the exhaustive set of trajectories to identify the elite set of trajectories that includes a second plurality of trajectories from the set of exhaustive trajectories with efficiency metrics above a second upper range threshold.

3. The method of claim 1, wherein the probabilistic assessment further comprises:

generating an initial parameter probability distribution from the plurality of waypoints;

generating a probabilistic set of trajectories of a predefined number of trajectories based on the initial parameter probability distribution, such that a probability distribution for parameters of the probabilistic set of trajectories matches the initial parameter probability distribution; and selecting the elite set of trajectories from the probabilistic set of trajectories.

4. The method of claim 3, wherein selecting the elite set of trajectories from the probabilistic set of trajectories further comprises:

generating a subsequent parameter probability distribution from waypoints included in the elite set of trajectories;

generating a subsequent probabilistic set of trajectories of the predefined number based on the subsequent parameter probability distribution such that a second probability distribution for parameters of the elite set of trajectories matches the subsequent parameter probability distribution; and selecting new set of trajectories from the subsequent probabilistic set of trajectories as the elite set of trajectories.

5. The method of claim 1, wherein the mobile waypoints are waypoints at which at least one element of the course is adjusted in a particular trajectory of the elite set of trajectories; and waypoints in the particular trajectory at which at least one of the elements of the course is not adjusted are removed from the particular trajectory when performing the global optimal path assessment.

6. The method of claim 1, wherein the positions of the mobile waypoints are adjusted within the associated trajectory within a range on the trajectory defined by halfway-points between the mobile waypoints.

7. The method of claim 1, wherein the waypoints with allowable parameters specify at least one criterion selected from the group comprising:

a longitude;
a latitude;
an in-cabin noise level;
an environmental noise level;
an available thrust for the aircraft;
an elapsed flight time;
a sea-level altitude for the aircraft;
a ground-level altitude for the aircraft;
a weight of the aircraft;
a cumulative efficiency merit for a flight; and
an operational event for the aircraft.

8. The method of claim 1, wherein waypoints of the plurality of waypoints specify a condition for the aircraft to satisfy at a given time in the flightpath, the condition including:

a weight of the aircraft;
an available thrust of the aircraft; and
a pitch of the aircraft.

9. A system, comprising:

a processor;
a memory, including instructions that when executed by the processor enable the system to:

generate a plurality of waypoints with allowable parameters for a flightpath at which a course, including elements for heading, altitude, and speed, of an aircraft is adjustable;

calculate a number of trajectories available based on the plurality of waypoints;

in response to determining that the number of trajectories is greater than a threshold number of trajectories, perform a probabilistic assessment of the trajectories to identify an elite set of trajectories that includes a plurality of trajectories from a set of assessed trajectories with efficiency metrics having values above an upper range threshold;

differentiate mobile waypoints from static waypoints in the plurality of trajectories of the elite set of trajectories;

perform a global optimal path assessment, wherein positions of mobile waypoints are adjusted within an associated trajectory to identify an optimal trajectory for the aircraft on the flightpath; and provide the optimal trajectory to the aircraft to follow the flightpath according to the optimal trajectory.

10. The system of claim 9, wherein, in response to determining that the number of trajectories is less than the threshold number of trajectories the system is further enabled to:

generate an exhaustive set of trajectories corresponding to the trajectories; and perform an exhaustive assessment on the exhaustive set of trajectories to identify the elite set of trajectories that includes a second plurality of trajectories from the set of exhaustive trajectories with efficiency metrics above a second upper range threshold.

11. The system of claim 9, wherein to perform the probabilistic assessment the system is further enabled to:

generate an initial parameter probability distribution from the plurality of waypoints;

generate a probabilistic set of trajectories of a predefined number based on the initial parameter probability distribution, such that a probability distribution for parameters of the probabilistic set of trajectories matches the initial parameter probability distribution; and select the elite set of trajectories from the probabilistic set of trajectories.

12. The system of claim 11, wherein to select the elite set of trajectories from the probabilistic set of trajectories the system is further enabled to:
generate a subsequent parameter probability distribution from waypoints included in the elite set of trajectories;
generate a subsequent probabilistic set of trajectories of the predefined number based on the subsequent parameter probability distribution such that a second probability distribution for parameters of the elite set of trajectories matches the subsequent parameter probability distribution; and
select a new set of trajectories from the subsequent probabilistic set of trajectories as the elite set of trajectories.

13. The system of claim 9, wherein the mobile waypoints are waypoints at which at least one element of the course is adjusted in a particular trajectory of the elite set of trajectories; and
waypoints in the particular trajectory at which at least one of the elements of the course is not adjusted are removed from the particular trajectory when performing the global optimal path assessment.

14. The system of claim 9, wherein the positions of the mobile waypoints are adjusted within the associated trajectory within a range on the trajectory defined by halfwaypoints between the mobile waypoints.

15. The system of claim 9, wherein the waypoints with allowable parameters specify at least one criterion selected from the group comprising:
a longitude;
a latitude;
an in-cabin noise level;
an environmental noise level;
an available thrust for the aircraft;
an elapsed flight time;
a sea-level altitude for the aircraft;
a ground-level altitude for the aircraft;
a weight of the aircraft; and
an operational event for the aircraft.

16. A non-transitory computer readable medium including instructions that when executed by a processor enable the processor to perform an operation, the operation comprising:
generating a plurality of waypoints with allowable parameters for a flightpath at which a course, including elements for heading, altitude, and speed, of an aircraft is adjustable;
calculating a number of trajectories available based on the plurality of waypoints;
in response to determining that the number of trajectories is greater than a threshold number of trajectories, performing a probabilistic assessment of the trajectories to identify an elite set of trajectories that includes a plurality of trajectories from a set of assessed trajectories with efficiency metrics having values above an upper range threshold;
differentiating mobile waypoints from static waypoints in trajectories of the elite set of trajectories;
performing a global optimal path assessment, wherein positions of mobile waypoints are adjusted within an associated trajectory to identify an optimal trajectory for the aircraft on the flightpath; and
providing the optimal trajectory to the aircraft to follow the flightpath according to the optimal trajectory.

17. The computer readable medium of claim 16, wherein, in response to determining that the number of trajectories is less than the threshold number of trajectories:
generating an exhaustive set of trajectories corresponding to the trajectories; and
performing an exhaustive assessment on the exhaustive set of trajectories to identify the elite set of trajectories that include those trajectories with efficiency metrics within an upper range of the set of exhaustive trajectories.

18. The computer readable medium of claim 16, wherein the probabilistic assessment further comprises:
generating an initial parameter probability distribution from the plurality of waypoints;
generating a probabilistic set of trajectories of a predefined number of trajectories based on the initial parameter probability distribution such that a probability distribution for parameters of the probabilistic set of trajectories matches the initial parameter probability distribution; and
selecting the elite set of trajectories from the probabilistic set of trajectories.

19. The computer readable medium of claim 18, wherein selecting the elite set of trajectories from the probabilistic set of trajectories further comprises:
generating a subsequent parameter probability distribution from waypoints included in the elite set of trajectories;
generating a subsequent probabilistic set of trajectories of the predefined number based on the subsequent parameter probability distribution such that a second probability distribution for parameters of the elite set of trajectories matches the subsequent parameter probability distribution; and
selecting a new set of trajectories from the subsequent probabilistic set of trajectories as the elite set of trajectories.

20. The computer readable medium of claim 16, wherein the mobile waypoints are waypoints at which at least one element of the course is adjusted in a particular trajectory of the elite set of trajectories, wherein the at least one element of the course includes one or more of:
a heading;
a speed; and
an altitude; and
waypoints in the particular trajectory at which at least one of the elements of the course is not adjusted are removed from the particular trajectory when performing the global optimal path assessment.

* * * * *